Figure 1:
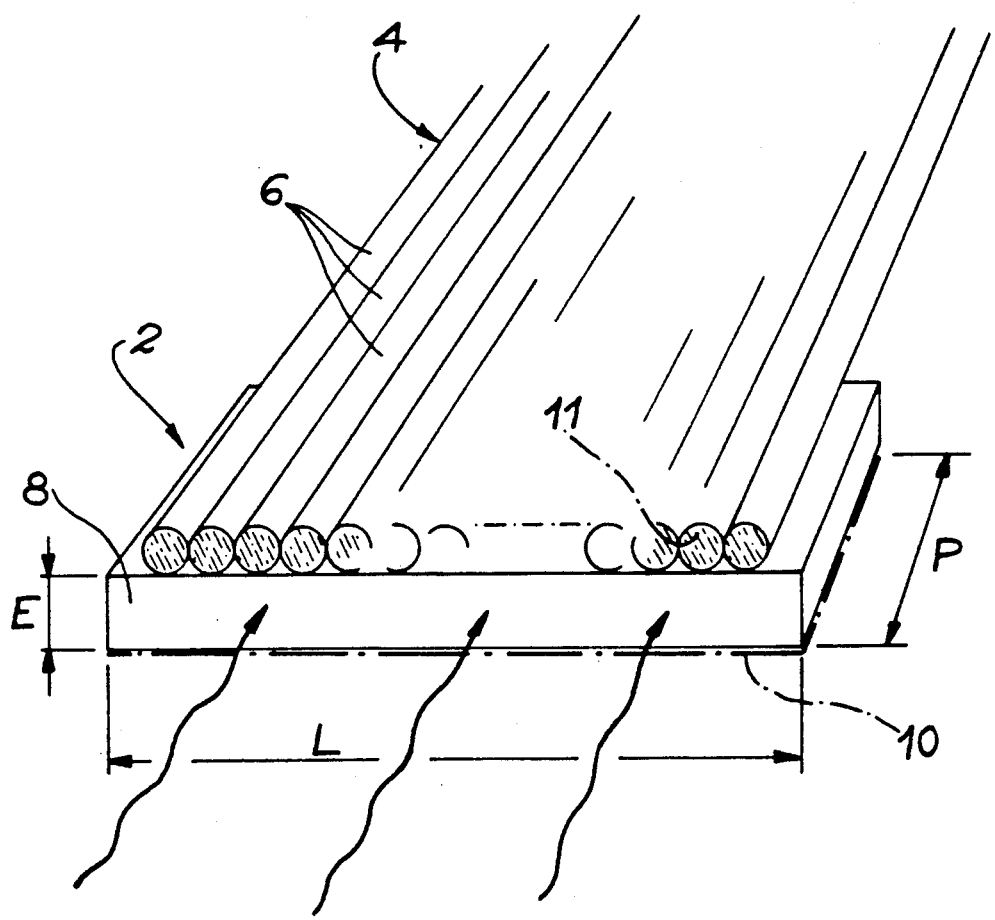

United States Patent [19]

Bourdinaud et al.

[11] Patent Number: 5,103,099
[45] Date of Patent: Apr. 7, 1992

[54] DEVICE FOR LINEAR DETECTION OF RADIATION

[75] Inventors: Michel Bourdinaud, Bures, France; Michel Laguesse, Ougree, Belgium

[73] Assignee: Commissariat a l'Energie Atomique, Paris, France

[21] Appl. No.: 598,974

[22] Filed: Oct. 17, 1990

[30] Foreign Application Priority Data

Oct. 17, 1989 [FR] France .................. 89 13547

[51] Int. Cl.⁵ .................. G01T 1/20; G01N 23/223
[52] U.S. Cl. .................. 250/368; 250/487.1
[58] Field of Search .............. 250/368, 487.1, 363.01

[56] References Cited

U.S. PATENT DOCUMENTS

| 4,806,757 | 2/1989 | Kano et al. | 250/327.2 |
| 4,880,987 | 11/1989 | Hosoi et al. | 250/484.1 |
| 4,946,238 | 8/1990 | Sashin et al. | 250/368 |

FOREIGN PATENT DOCUMENTS

| 45893 | 6/1990 | Australia .. |
| 0377825 | 7/1990 | European Pat. Off. . |
| 2552887 | 4/1985 | France . |

OTHER PUBLICATIONS

Eckardt et al., "A Novel Light-Collection System for Segmented Scintillation-Counter", Nucl. Instr. & Methods 155, No. 3 (1978) pp. 389-398.
IBM Technical Disclosure Bulletin, vol. 16, No. 9, fevrier 1974, p. 3102, New York, US; R. W. Dreyfus: "Image Intensifier".
Nuclear Instruments and Methods in Physics Research, vol. 228, No. 2/3, pp. 303-308, janvier 1985, Elsevier Science Publishers B. V., Amsterdam, NL., H. Fessler et al., "A Tower Structured Scintillator-Lead Photon Calorimeter Using a Novel Fiber Optics Readout System".

Primary Examiner—Janice A. Howell
Assistant Examiner—Richard Hanig
Attorney, Agent, or Firm—Oblon, Spivak, McClelland, Maier & Neustadt

[57] ABSTRACT

A device for linear detection of radiation includes at least one thin plate (2) of a dense scintillating material, placed parallel to the direction of the beam of the radiation, the beam penetrating the plate by its edge beam, the plate having a sufficient depth in the direction of the beam to stop the major part of the radiation which has penetrated there, and at least one group of fluorescent optical fibers (4), which can be excited by the visible light emitted by the material under the impact of the radiation, these fibers having portions (6) which are parallel, adjacent and attached to one of the two faces of the plate so that these portions are parallel to the direction of the beam, thus making possible locating, along the edge of the plate, the impact of the particles of the radiation. The device has applications in medical imagery and in parts and luggage inspection.

14 Claims, 5 Drawing Sheets

DEVICE FOR LINEAR DETECTION OF RADIATION

BACKGROUND OF THE INVENTION

This invention relates to a radiation detection device.

By "radiation," in particular an x-ray radiation or a gamma radiation or even a radiation consisting of high-energy electrons is meant.

The invention finds applications in many fields, in particular in physics (x-ray crystallography . . . ), in the medical field (radiography, tomography, angiography . . . ), in the industrial field (detection of defects, welding inspection . . . ) and in the field of security (luggage inspection . . . ).

Various radiation detection devices are already known.

Thus, a photographic plate combined with an intensifing screen has constituted for a long time the only means to achieve the acquisition and the display of x images. Moreover, this technique is still now in use but is gradually being replaced by systems achieving the acquisition of an x image in digital form to be able to display it in real time, without requiring the stage of development and of fixing that the traditional photographic systems require.

Several systems making possible the acquisition of an x image in digital form are already known but present drawbacks:

The wire chambers, for example, marketed by the Schlumberger Company, have a detection effectiveness which is limited to about 25%.

Such an effectiveness is obtained, moreover, only with a fairly large chamber. The spatial resolution of these chambers is not very good (on the order of several millimeters). Moreover, these chambers are filled with gas (argon or xenon, for example) whose gradual pollution is troublesome, the chambers requiring a recycling system which is bulky.

The systems, for example marketed by the Thomson Company, comprising photodiodes which are combined in bars with a pitch of 1 or 0.5 mm and which are preceded by a scintillation counter consisting of a layer of about 0.3 mm of $Gd_2O_2S$, have a low detection effectiveness above 100 keV given the slight thickness of the scintillation counter. This thickness cannot be increased, however, without running the risk of deteriorating the spatial resolution. Moreover, this scintillation counter presents a significant reduction of visible photons.

The brilliance amplifiers, for example marketed by the Philips and Thomson companies, constitute bidimensional sensors, which can be advantageous in some case, because no outer scanning system is necessary. However, these brilliance amplifiers present several drawbacks, namely a great sensitivity to the x rays diffused by an object to be analyzed and limited dynamics and, finally, the necessity of a compromise between the resolution and the stopping power of these brilliance amplifiers.

This invention relates to a radiation detection device which, contrary to known devices mentioned above, exhibits both a great detection effectiveness and a good spatial resolution.

SUMMARY OF THE INVENTION

For this purpose, this invention uses a thin plate of a dense scintillating material, the radiation to be detected penetrating in the plate along the edge of the latter, the depth of the plate in the direction of the radiation being enough to make possible the stopping of the major part of the radiation which has penetrated the plate.

Thus, the slight thickness of the scintillating material makes possible a good spatial resolution and its great depth, calculated in the direction of the incident radiation, makes possible a great detection effectiveness.

Specifically, this invention has as its object a device for detection of a radiation beam of a given direction, a device characterized in that it comprises:

at least one thin plate of a dense scintillating material, this plate being placed parallel to the direction of the beam so that the latter penetrates the plate by the edge of the latter, this plate having a sufficient depth in the direction of the beam to stop the major part of the radiation which has penetrated the plate, and at least one group of fluorescent optical fibers, which can be excited by the visible light emitted by the scintillating material under the impact of the radiation, these fibers having portions which are parallel, adjacent and attached to one of the two faces of the plate so that said portions of the fibers are parallel to the direction of the beam, thus making possible locating, along the edge of the plate, the impact of the particles of the incident radiation.

This invention also has as its object a device for detection of a radiation beam, device characterized in that it comprises:

at least one thin plate of a dense scintillating material, at least one group of fluorescent optical fibers, which can be excited by the visible light emitted by the scintillating material under the impact of the radiation, these fibers having portions which are parallel, adjacent and attached to one of the two faces of the plate, and means of collimation of the beam, these collimation means being able to impose on the beam an orientation parallel to the plate and to said portions of fibers, so that this beam penetrates the plate by the edge of the latter, this plate having a sufficient depth to stop the major part of the radiation which has penetrated there, the device thus making possible locating, along the edge of the plate, the impact of the particles of the incident radiation.

This invention further has as its object a device for detection of a radiation beam, device characterized in that it comprises:

at least one thin plate of a dense scintillating material, at least one group of fluorescent optical fibers, which can be excited by the visible light emitted by the scintillating material under the impact of the radiation, these fibers having portions which are parallel, adjacent and attached to one of the two faces of the plate, and relative displacement means of the plate relative to the incident beam, this plate having a sufficient depth to stop the major part of the radiation which has penetrated the plate by the edge of the latter, the device thus making possible locating, along the edge of the plate, the impact of the particles of the incident radiation and forming a bidimensional detector thanks to the relative displacement.

This invention also has as its object a device for detection of a radiation beam, device characterized in that it comprises:

at least one thin plate of a dense scintillating material, this plate having a sufficient depth to stop the major part of the radiation which has penetrated the plate by the edge of the latter, at least one group of fluorescent optical fibers, which can be excited by the visible light emitted by the scintillating material under the impact of the radiation, these fibers having portions which are parallel, adjacent and attached at one of the two faces of the plate, for each fiber, a means for detection of the light of fluorescence produced and guided by this fiber when it is excited, and means of electronic processing of signals provided by the detection means, the device thus making possible locating, along the edge of the plate, the impact of the particles of the incident radiation.

In a particular configuration, said portions attached to the plate are end portions of the fibers.

According to a first particular embodiment of the invention, the other face of the plate is made reflective or diffusing for the light emitted by the scintillating material under the impact of the radiation.

According to a second particular embodiment, the device of the invention comprises two thin plates of the scintillating material, which frame the unit formed by said portions of the fibers.

According to a third particular embodiment, the device of the invention comprises two groups of fluorescent optical fibers, the unit formed by said portions of the fibers of one of the groups and the unit formed by said portions of the fibers of the other group framing the plate of scintillating material; preferably, said portions of one of the units are placed in zigzag relative to said portions of the other unit; these units are offset relative to one another so that by observing the plate by the edge, the axes of said portions of the fibers form the vertexes of a zigzag line.

In a particular embodiment of the invention, the plate of scintillating material has an isotropic structure.

In another particular embodiment of the invention, the plate is able to guide the visible light which is emitted by the scintillating material under the impact of the radiation, in a way approximately perpendicular to the faces of the plate, toward the fibers, the structure of the plate then being anisotropic.

In a particular embodiment corresponding to such an anisotropic structure, the plate of scintillating material has a structure of pillars, these pillars are oriented perpendicularly to the faces of the plate, are placed in parallel rows and are able to guide the visible light emitted by the scintillating material under the impact of the radiation, and said portions of the fibers are placed parallel to these rows and perpendicular to the pillars.

Finally, the dense scintillating material preferably is inorganic. For example, it has a base of cesium iodide.

Actually, an organic scintillating material such as polystyrene, for example, is characterized by a too weak stopping power of the x-ray photons, which leads to a low detection effectiveness; moreover, as soon as the energy from an x photon exceeds 20 keV, the interaction by the Compton effect in the polystyrene becomes more probable than the interaction by photoelectric effect and the diffusion of the secondary photons which results from it causes a loss of resolution.

In this invention, CsI(Tl), for example, can be used as scintillating material, which is not very hygroscopic and which has the advantage of having a good conversion effectiveness and a significant density, leading to a sufficient stopping power, and a Compton effect which is dominant only beyond 300 keV.

Scintillating material CsI(Na), which has a different emission spectrum but is hygroscopic, can also be used.

Figure 1A:
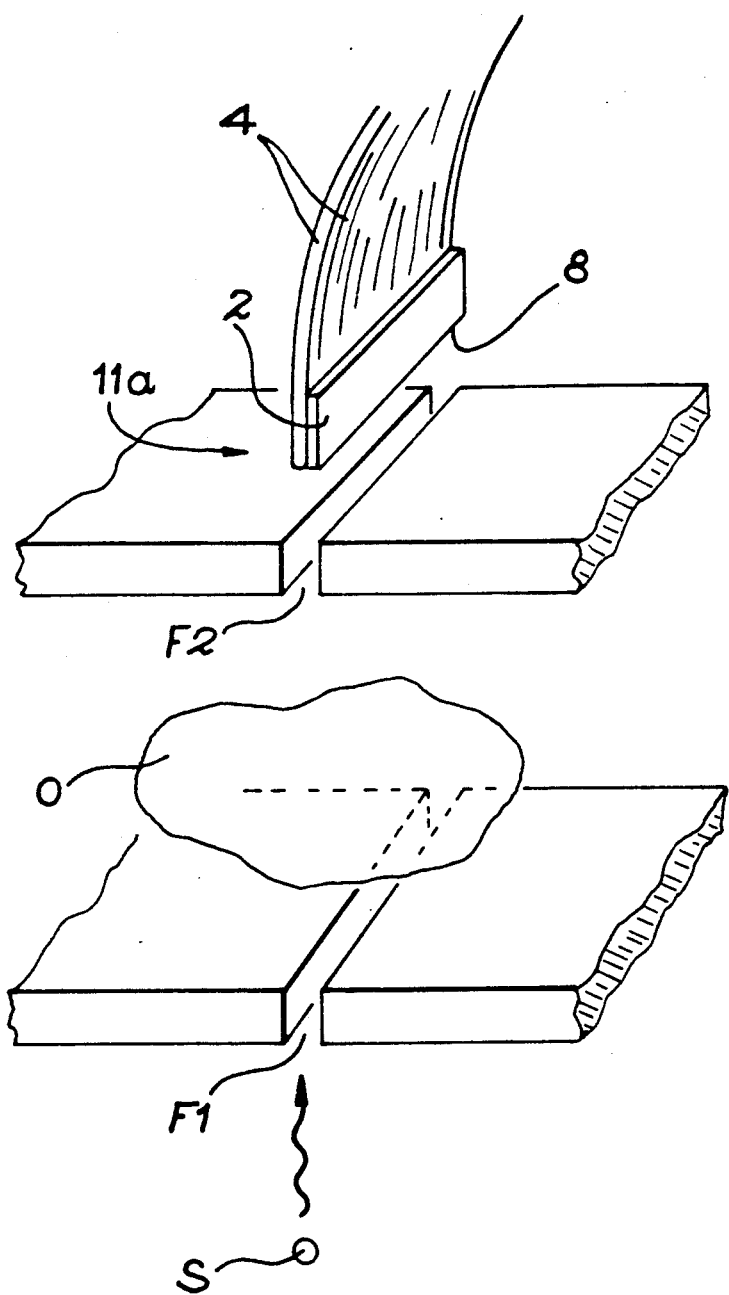
Figure 2:
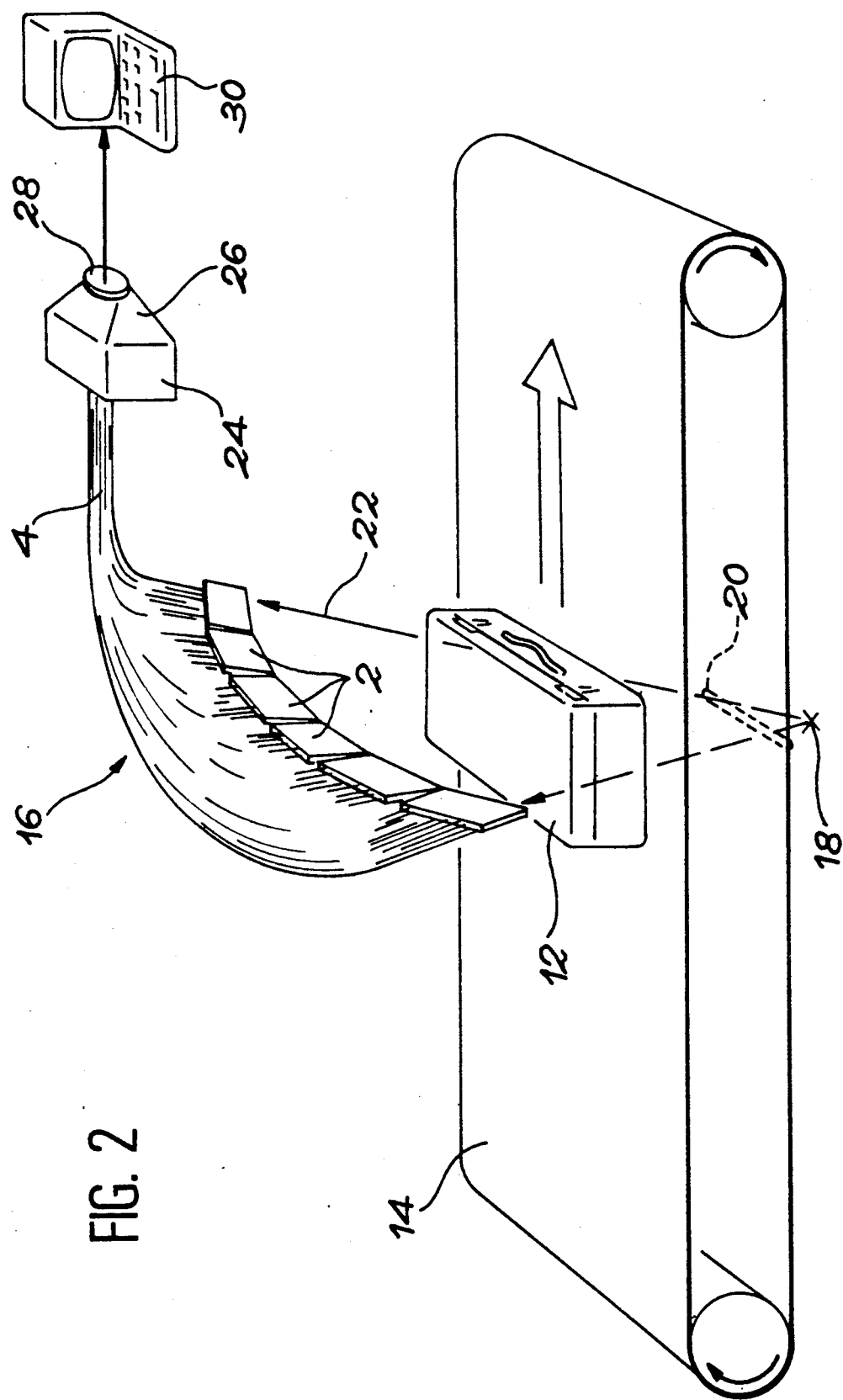
Figure 3:
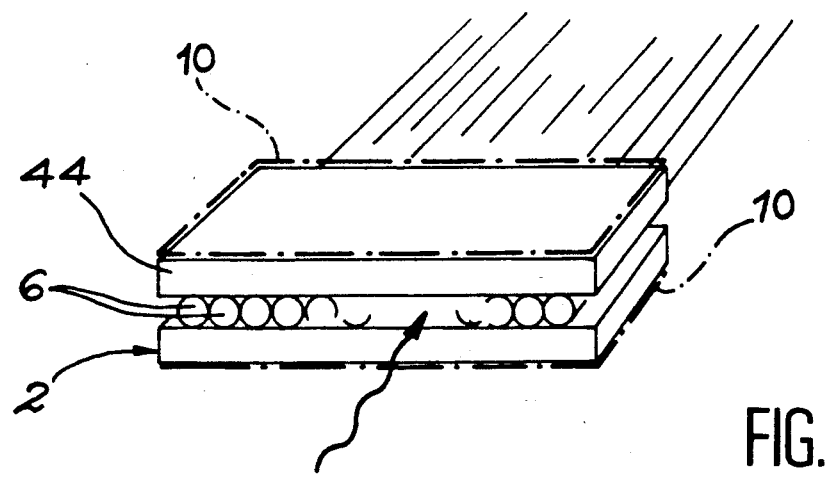
Figure 4:
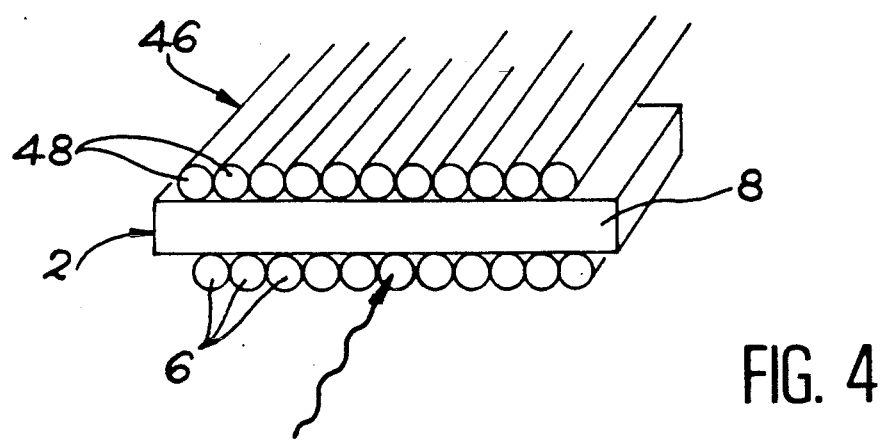
Figure 5:
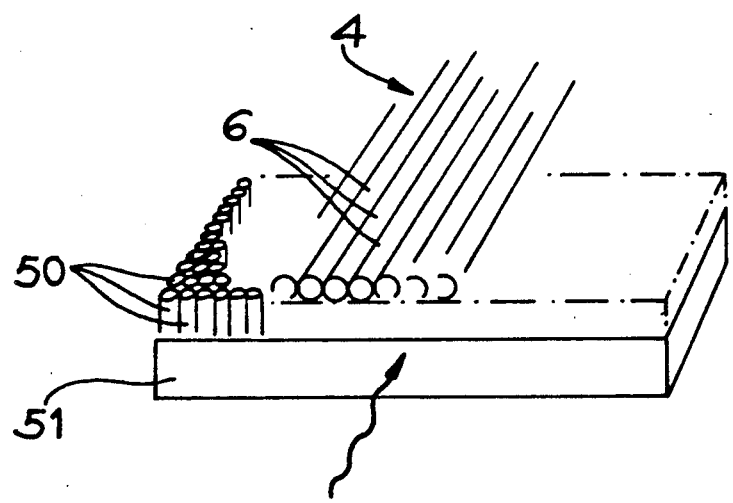
Figure 6:
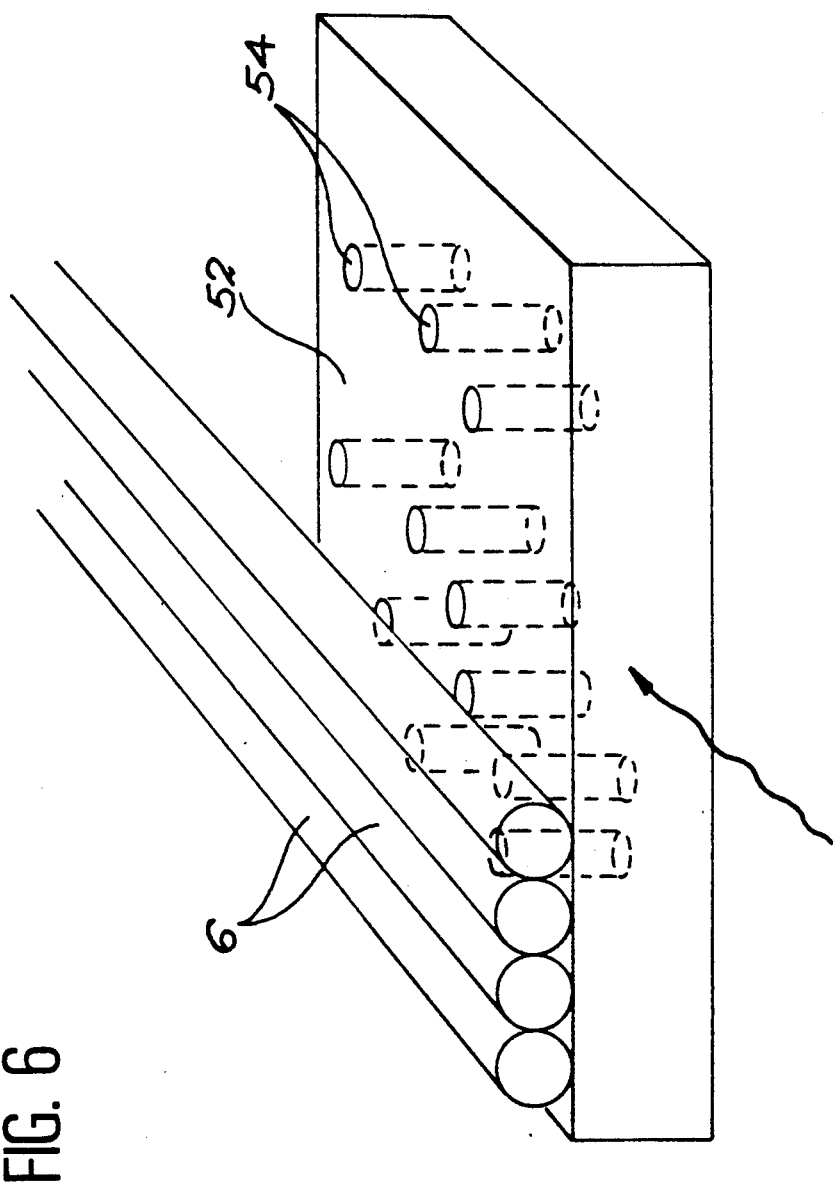

This invention will be better understood in the reading of the following description of embodiments given purely by way of indication and not at all limiting, in reference to the accompanying drawings in which;

FIG. 1 is a diagrammatic view of a device according to the invention, using a plate of scintillating material with an isotropic structure, FIG. 1A is a diagrammatic view of a device according to the invention, comprising collimation slots, FIG. 2 diagrammatically illustrates an application of the device shown in FIG. 1 to luggage inspection, FIGS. 3 and 4 are diagrammatic views of other particular embodiments also using a plate of scintillating material with an isotropic structure, and FIGS. 5 and 6 diagrammatically illustrate other embodiments of the invention, using a plate of scintillating material with an anisotropic structure.

The device according to the invention, which is diagrammatically shown in FIG. 1, is intended to detect a radiation, for example, an x-ray radiation or a gamma radiation, and comprises for this purpose a thin plate 2, with an isotropic structure, of a dense scintillating material, able to emit a visible light under the impact of the radiation.

The device shown in FIG. 1 also comprises multiple fluorescent optical fibers 4, for example fluorescent plastic optical fibers (with an optical sheath and core of plastic, the core being fluorescent), whose respective portions 6, for example, the end portions, are parallel, placed against one other and attached to a face of plate 2, parallel to the length or to the width of the latter, these portions thus forming a sort of sheet placed against one of the faces of plate 2.

Fluorescent fibers which can be excited by the visible light emitted by the scintillation under the impact of the radiation are chosen.

Given a beam of the radiation to be detected, of a given direction, the plate is placed parallel to this direction, so that said portions 6 of fibers 4, portions which are attached to the plate, are parallel to the direction of the beam, the radiation thus penetrating the plate by edge 8 of the latter.

A plate 2 is chosen having a depth P, according to the direction of the beam, variable according to the energy of the photons, but sufficient so that the plate is able to stop the essential part of the incident radiation.

Under the impact of the latter, the scintillation counter emits a visible light which excites the fluorescent material with which the core of fibers 4 is doped.

Actually, given a point of impact of a particle (photon for an x radiation or gamma radiation) of the radiation, only one or more adjacent fibers are excited by the resulting visible light and this point of impact can thus be located by analyzing the light of fluorescence of which one part is guided to an end of each fiber (end opposite to that which is attached to the plate in the example shown in FIG. 1).

A linear detector making possible locating of particles of the radiation is thus available. These are fibers 4 of the detector which assure this locating function.

To increase the number of scintillation photons received by each fiber, the face of plate 2, opposite to that which carries said portions of the fibers, portions which are attached to the plate, can be made reflective or diffusing relative to the light emitted by the scintillation counter. For this purpose, this opposite face can be covered, for example with an aluminum layer 10.

Purely by way of indication and not at all limiting, fluorescent fibers are used whose optical sheath has a diameter on the order of 1 mm or 0.5 mm and a thin plate of CsI(T1), of rectangular shape and said portions of fluorescent fibers are placed parallel to the width of the plate, length L of this plate is on the order of several tens of centimeters and its thickness E is on the order of several tenths of a millimeter; the width, or depth P in this case, is on the order of 2 to 3 cm for the detection of x photons and on the order of 5 to 6 cm for the detection of gamma photons, which gives the plate a very great stopping power (close to 100% for the x photons up to 300 keV), the device keeping, however, a good spatial resolution, close to 0.5 mm, because of the slight thickness of the plate.

By using the detection device with a radiation source (for example, x radiation), equipped with one or multiple collimation slots, the device offers the advantage of being not very sensitive to the x photons diffused by the object to be analyzed.

These collimation slots can be placed between the object to be analyzed and the radiation source and/or between this object and the detection device.

By way of example, there is seen in FIG. 1A a radiation source S, a device 11a of the type of that which is shown in FIG. 1 and an object to be analyzed O, placed between source S and device 11a; a collimation slot F1 and a collimation slot F2 are respectively placed between source S and object O and between the latter and device 11a; slots F1, F2 and edge 8 of the plate of device 11a, by which the radiation penetrates, are parallel and "aligned" (placed opposite), as is seen in FIG. 1A, and slots F1 and F2 are attached relative to device 11a.

The slot located between the object and the detection device (slot F2 in the example of FIG. 1A) is not, however, essential, because the detection device is autocollimated by its embodiment principle.

The device, equipped with an electronic system making possible the independent reading and, in real time, of data provided by each of the fibers of the sheet, can achieve the acquisition of x images or gamma images in digital form.

According to the application, the reading can be achieved at only one of the ends of each fiber or at each of these ends (the portions of fibers attached to the scintillation plate then being extended on both sides by the portions for transport of the optical signals).

By using a plate of great length L or else several devices whose respective plates are placed beside one another so that their lengths L are added, the acquisition of images of large dimension can be made. In the latter case, the plates can be distributed along a polygonal line centered on the radiation source (for example, an x-ray tube), to prevent the parallax effect.

As a reading system, a system can be used successively comprising, following fluorescent fibers, an image intensifier at which the ends of the fibers terminate, opposite to those which are beside the plate in the example of FIG. 1, a section reduction system (or "taper" in the publications in the English language) and a charge transfer device (CCD diode matrix) making it possible to integrate, during a certain time period, the light signal provided by each fiber.

The gain of the image intensifier is adjustable as a function of the object to be analyzed: this gain is increased when the object is very opaque and the gain is reduced when it is less so. This makes it possible to store the maximum charges in the CCD matrix for each x photon or incident gamma photon, while remaining, however, always on this side of the saturation of the system. The inaccuracy due to the "statistics" of the charges collected in each CCD well is then minimal.

In the example of FIG. 1, the faces of the ends of the fibers attached to the scintillation counter can be made reflective or diffusing relative to the light guided in these fibers, to increase the signal received by the reading system. For this purpose, these faces can be covered, for example, with an aluminum layer 11.

Of course, since the detection device is of the linear type, scanning means are necessary to reconstitute an image in two dimensions. For example, in some applications, the object to be analyzed is displaced relative to the detection device and to the radiation source, the latter being stationary relative to one another. In other applications, the detection device is displaced relative to the radiation source, the object then being able to be stationary or mobile.

FIG. 2 diagrammatically illustrates an application of the invention in the inspection of luggage (12) which passes on a conveyor belt 14 in front of a detection device 16 according to the invention, a single piece of luggage being shown in FIG. 2.

A pinpoint source 18 of x rays is placed under conveyor belt 14 (made of a material transparent to the x rays), opposite device 16. This source is equipped with a collimator 20 with a rectilinear slot and oriented perpendicularly to the direction of passage of the luggage, and thus makes it possible to obtain a fan-shaped x-ray beam (22) which goes through a piece of luggage 12 coming in at the level of the source.

Device 16 comprises multiple elementary devices of the type of that which has been described by making reference to FIG. 1, respective plates 2 of these elementary devices being placed side by side in an arc of a circle, above conveyor belt 14, perpendicular to the direction of passage of the luggage, so that fan-shaped beam 22 "falls" on the juxtaposed edges of plates 2 of scintillating material.

One of the electronic reading systems of detection device 16 able to used is also seen in FIG. 2. This system successively comprises an image intensifier 24, a section reduction system or "taper" 26 and a CCD matrix 28 which is connected to means 30 for processing and display making it possible to see the objects which can be present in the luggage.

The application diagram of FIG. 2 shows an advantage of the device of the invention: it makes possible the production of a detector whose electronic part is completely offset outside the radiation beam.

The device according to the invention, which is diagrammatically shown in FIG. 3, differs from that which is shown in FIG. 1 by the fact that it further comprises another thin plate 44 of scintillating material, which is identical with plate 2 and is attached to portions 6 of the fibers so that the latter are framed by thin plates 2 and 44.

The coefficient of use of the radiation source (x-ray generating tube, for example), thus is increased.

The device according to the invention, which is diagrammatically shown in FIG. 4, differs from that which is shown in FIG. 1 in that it further comprises another unit of fluorescent plastic optical fibers 46, whose respective portions 48 are parallel, placed against one another and attached, parallel to portions 6, to the face of plate 2, opposite to that which carries these portions 6, the latter and portions 48 being placed zigzag: they are offset relative to one another so that by observing the device through the edge, the axes of portions 6 and 48 form the vertexes of a zigzag line. This device offers the advantage of improving the spatial resolution.

Of course, in this case, the face of the plate, which carries portions 48, is not aluminized.

With the device shown in FIG. 4, the reading system shown in FIG. 2 can be used, all fibers 4 and 46 terminating at the image intensifier.

In the invention, fibers can be used whose portions attached to the plate of scintillating material have a circular section or an approximately square section.

Further, instead of using a plate with isotropic structure, a plate with anisotropic structure can be used, which preferably sends the visible light of scintillation in an approximately perpendicular way to the faces of this plate.

To do this, there can be used (FIG. 5) a thin plate 50 comprising a substrate 51 and, on this substrate, parallel and adjacent rows of pillars, or cylindrical needles, of CsI(Tl), for example, which are perpendicular to the faces of plate 50 (i.e. oriented according to the thickness of the plate) and therefore perpendicular to the direction of the incident radiation.

Such a plate can be produced by special deposition techniques. On this subject, reference can be made in particular to the article of K. OBA et al. titled "A CsI(Na) scintillation plate with high spatial resolution" and published in the journal Advances in electronics and electron physics, vol. 74 (1988), pp. 247 to 255.

The height of the pillars does not exceed a value on the order of twenty times the diameter of these pillars. By way of example, pillars are produced whose diameter is on the order of 25 micrometers and whose height is on the order of 0.5 mm.

It will be noted that the portions of fluorescent fibers attached to the plate are parallel to the rows of pillars and perpendicular to these pillars.

The advantage of the device of FIG. 5 is that it leads to a very low intercoupling and that the number of photoelectrons at the end of the reception chain (CCD matrix) is higher than in the configuration using a plate of scintillating material with an isotropic structure.

In FIG. 6, another device according to the invention has been diagrammatically shown whose thin plate of scintillating material 52 also has an anisotropic structure leading to an emission of visible scintillation light preferably in a direction approximately perpendicular to the faces of plate 52.

To do this, a thin plate 52 of CsI(Tl) is used comprising a certain number of light deviation lines 54, consisting of small, thin cylinders which are juxtaposed and perpendicular to the faces of plate 52 in which these cylinders create optical discontinuities.

Deviation lines 54 are, for example, obtained by bombarding plate 52 by heavy ions perpendicular to the faces of plate 52. For this purpose, xenon ions of 5 MeV per nucleon, for example, are used.

In the traces of the bombardment, the material of the scintillation counter becomes amorphous and, as a result, is able to modify the path of a light ray to orient the latter in an approximately perpendicular way to the faces of the plate when it comes out of the latter.

We claim:

1. Device for detection of a radiation beam, which comprises:

at least one thin plate of a dense scintillating material, at least one group of fluorescent optical fibers, which can be excited by visible light emitted by the scintillating material under the impact of radiation, these fibers having portions which are parallel, adjacent and attached to one of the two faces of the plate, and means for collimation of the beam, for imposing on the beam an orientation parallel to the plate and to said portions of the fibers so that said beam penetrates the plate by the edge of the latter, this plate having a sufficient depth to stop the major part of the radiation which has penetrated there, the device thus making possible locating, along the edge of the plate, the impact of the particles of the incident radiation.

2. Device for detection of a radiation beam, which comprises:

at least one thin plate of a dense scintillating material, at least one group of fluorescent optical fibers, which can be excited by the visible light emitted by the scintillating material under the impact of radiation, these fibers having portions which are parallel, adjacent and attached to one of the two faces of the plate, and means for displacement of said plate relative to the incident beam, this plate having a sufficient depth to stop the major part of the radiation which has penetrated the plate through its edge, the device thus making possible locating, along the edge of the plate, the impact of the particles of the incident radiation and forming a bidimensional detector due to the relative displacement.

3. Device for detection of a radiation beam, which comprises:

at least one thin plate of a dense scintillating material, this plate having a sufficient depth to stop the major part of the radiation which has penetrated the plate through its edge, at least one group of fluorescent optical fibers, which can be excited by the visible light emitted by the scintillating material under the impact of the radiation, these fibers having portions which are parallel, adjacent and attached to one of the two faces of the plate, for each fiber, a means for detection of the light of fluorescence produced and guided by this fiber when it is excited, and electronic means for processing signals provided by the detection means, the device thus making possible locating, along the edge of the plate, the impact of the particles of the incident radiation.

4. Device according to claim 3, wherein the other face of the plate is made reflective or diffusing for the light emitted by the scintillating material under the impact of the radiation.

5. Device according to claim 3, which comprises thin plates of scintillating material, which frame the unit formed by said portions of the fibers.

6. Device according to claim 3, which comprises two groups of fluorescent optical fibers, the unit formed by said portions of fibers of one of the groups and the unit formed by said portions of fibers of the other group framing the plate of scintillating material.

7. Device according to claim 6, wherein said portions of one of the units are placed in a zigzag fashion relative to said portions of the other unit.

8. Device according to claim 3, wherein said plate of the scintillating material has an isotropic structure.

9. Device according to claim 3, wherein said plate of scintillating material is able to guide the visible light which is emitted by the scintillating material under the impact of the radiation, in a way approximately perpendicular to the faces of the plate.

10. Device according to claim 9, wherein said plate of scintillating material has a structure of pillars, wherein these pillars are oriented perpendicularly to the face of the plate, are placed in parallel rows and are above to guide the visible light emitted by the scintillating material under the impact of the radiation and wherein said portions of the fibers are placed parallel to these rows and perpendicular to the pillars.

11. Device according to claim 3, wherein the dense scintillating material is inorganic.

12. Device according to claim 11, wherein the dense scintillating material has a base of cesium iodide.

13. A device according to claim 3, wherein:
the spatial resolution of the location along the edge of the thin plate is a function of the thickness of the thin plate, and more detailed spatial resolution is obtained with thinner plates.

14. A device according to claim 3, wherein:
the thickness of said at least one thin plate is roughly equal to the diameter of the optical fibers, thereby providing a spatial resolution which is approximately equal to the diameter of the optical fibers.

* * * * *